United States Patent
Veit et al.

(10) Patent No.: US 7,597,625 B2
(45) Date of Patent: Oct. 6, 2009

(54) SNAP-IN DISK AND OVERLOAD CLUTCH WITH A SNAP-IN DISK

(75) Inventors: Juergen Veit, Leinfelden-Echterdingen (DE); Dietmar Saur, Gomaringen (DE); Helmut Heinzelmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 10/579,664

(22) PCT Filed: Jun. 17, 2005

(86) PCT No.: PCT/EP2005/052812

§ 371 (c)(1),
(2), (4) Date: May 18, 2006

(87) PCT Pub. No.: WO2006/010673

PCT Pub. Date: Feb. 2, 2006

(65) Prior Publication Data

US 2007/0149293 A1 Jun. 28, 2007

(30) Foreign Application Priority Data

Jul. 28, 2004 (DE) .................. 10 2004 036 586

(51) Int. Cl.
*F16D 7/04* (2006.01)
(52) U.S. Cl. ..................................... 464/37

(58) Field of Classification Search ............. 464/35–39; 419/5; 29/DIG. 31
See application file for complete search history.

(56) References Cited

U.S. PATENT DOCUMENTS

| 1,757,125 | A | * | 5/1930 | Levedahl | 464/39 X |
| 1,913,046 | A | * | 6/1933 | Callan | 464/39 X |
| 2,291,407 | A | * | 7/1942 | Paul | 464/39 |
| 2,561,136 | A | | 7/1951 | Richardson | |
| 2,744,396 | A | * | 5/1956 | Nagy et al. | 464/38 |
| 2,802,354 | A | | 8/1957 | Bohnhoff et al. | |
| 3,557,574 | A | * | 1/1971 | Avery | 464/38 |
| 4,734,080 | A | * | 3/1988 | Kronert | 464/38 X |
| 6,610,244 | B2 | * | 8/2003 | Dollmeier et al. | 419/5 X |
| 2002/0179393 | A1 | | 12/2002 | Hirabayashi et al. | |

FOREIGN PATENT DOCUMENTS

EP   1 529 701   5/2005

* cited by examiner

*Primary Examiner*—Greg Binda
(74) *Attorney, Agent, or Firm*—Michael J. Striker

(57) ABSTRACT

A detent disk for an overload coupling part has a detent disk body configured as a powder-metallurgy produced disk body, the detent disk body has a substantially uniform wall thickness and an inner circumference, and at least one driving device for driving in a rotary manner is provided on the inner circumference and configured as a driving pocket.

9 Claims, 3 Drawing Sheets

SNAP-IN DISK AND OVERLOAD CLUTCH WITH A SNAP-IN DISK

CROSS REFERENCE TO A RELATED APPLICATION

The invention described and claimed hereinbelow is also described in German Patent Application DE 10 2004 036 586.5 filed on Jul. 28, 2004. This German Patent Applications, whose subject matter is incorporated here by reference, provides the basis for a claim of priority of invention under 35 U.S.C. 119(a)-(d).

BACKGROUND OF THE INVENTION

The present invention relates to a detent disk and an overload coupling with a detent disk.

Hand-guided machine tools such as rotary hammers and percussion hammers are usually equipped with an overload coupling that serves to protect an operator and the machine, and is designed to limit the maximum torque applied to the machine and to protect the drive from short-circuit operation or overload. This is brought about, e.g., by interrupting the rotary motion of the hammer tube, it being possible for torque to be transmitted by a spur gear transmission, the spur gear of which is connected by a separate detent disk with the hammer tube in a form-fit, non-positive and/or friction-based manner. Torque is usually transmitted between the spur gear and the detent disk using rolling elements or cams in the form of a claw clutch or using friction elements. These types of couplings require an axial preload, which is realized using compression springs or disk springs, which requires that the hammer tube absorb the forces axially. For this reason, the axial position of the detent disk is limited by a stop on the hammer tube, which can be designed, e.g., as a collar, profile, snap ring or the like. The detent disk must also be the overlatching contour and/or the receptacle for rolling elements. A small, compact design is required since installation space in rotary hammers is often very limited, and because the overload coupling is often located in a path that determines the overall length.

SUMMARY OF THE INVENTION

The present invention relates to a detent disk for an overload coupling, in particular for a machine tool. It is provided that the detent disk have a shape designed using powder metallurgy. The shape of the detent disk and/or its detent-disk body can be reproducibly defined by using a mould to manufacture them. Contours, surface profiles, inner and outer diameters and the like are defined by the mould and can be transferred to the detent-disk body during manufacture.

Detent disks which are common today are cost-intensive and laborious to manufacture. They are created either by using a material-removing process on solid material or by machining a semi-finished product. Additional machining work is often required to create a rotary driving device, e.g., a hammer tube. In contrast, the proposed detent disk can be manufactured easily using powder metallurgy, e.g., as sintered compact, or using an injection-moulding method, e.g., an MIM (metal injection moulding) process. The shape and geometry of the detent disk are reproducibly defined in the manufacturing process using a mould. As such, there exists a great deal of freedom in terms of shape. Uniform material wall thicknesses can be attained, even when the geometry is complex, and a compact, solid component can be created. The detent disk advantageously has an outer diameter with a contour that can vary in terms of shape. This makes it possible to increase durability while keeping the material wall thickness the same. The material wall thickness can be reduced for a given durability, which results in a savings of weight, material usage and costs.

The detent disk is preferably annular in shape and, in particular, has a substantially uniform material wall thickness.

In a favorable refinement, at least one driving device for driving in a rotary manner is formed on an inner circumference of the detent disk. Advantageously, a plurality of driving devices is distributed around the circumference. The one or more driving devices can be configured as tangentially-located driving pockets, in which driving pins can engage. As an alternative, bearing receptacles can be provided, in which bearings can engage. A driving profile is another feasible design of a driving device. The one or more driving devices can be selected as is suitable for a particular hammer tube.

Favorably, the detent disk has a durability-enhancing outer contour on its outer diameter, by way of which a stable and compact detent disk can be created.

In a favorable refinement, the detent disk can be provided with detent cams and/or recesses on its front face for accommodating rolling elements on the front side. The detent cams and/or recesses and the one or more driving devices are preferably offset relative to each other around the circumference. This enables a particularly small, compact design. If the detent disk is located in an overload coupling in a path of a machine tool that determines the overall length, an advantageously short overall length of the machine tool results.

An overload coupling is also provided, in particular for a machine tool, it being possible to interrupt transmission of torque from a drive unit to a tool using a detent disk. It is provided that the detent disk have a shape designed using powder metallurgy. The detent disk is stable and can be manufactured reproducibly with any shape, thereby resulting in the compact, reliable overload coupling that can be easily adapted to various configurations, of a hammer tube in particular. A high degree of reproducibility of the detent disk is made possible by the fact that it is manufactured using a mould.

A compact, small design results when the detent disk includes—preferably on its front face—detent cams and/or recesses for accommodating rolling elements which engage in a spur gear of a spur gear transmission, a toothed gearing of the spur gear and the detent cams overlapping each other in the axial direction.

When the detent disk includes, on its inner diameter, at least one driving device for establishing a rotary-driving connection with a rotary-driving means and/or a percussive-driving means, preferably a hammer tube, a reliable rotary driving motion can be attained with a rotary and/or percussive drive.

When the diameter of the detent disk at its circumferential outer contour—in the region beyond the detent cams—is similar to that of a root circle of a spur gear toothing of the spur gear, the result is an advantageous and reliable system for transmitting a release torque with a large amount of overlap between spur gear and detent disk.

With one method, it is proposed that the detent disk be formed using a mould-based, powder metallurgical method. Preferably, the detent disk can be formed by a sintered detent disk body or by a detent disk body manufactured using an injection-moulding method. Shaping by using a material-removing process on solid material or machining a semi-finished product can be eliminated.

The present invention is preferably suited for use with machine tools, in particular hand-guided machine tools, which are drivable in a rotating and/or percussive manner, e.g., drills, impact drills, rotary hammers, chisel hammers and the like.

BRIEF DESCRIPTION OF THE DRAWINGS

Further embodiments, aspects and advantages of the present invention also result independently of their wording in the claims, without limitation to generality, from exemplary embodiments of the present invention presented below with reference to the drawing.

FIG. 2 shows a detailed view of parts of an overload coupling with the detent disk in FIG. 1; and.

DESCRIPTION OF THE PREFERRED EMBODIMENTS

Figure 1:
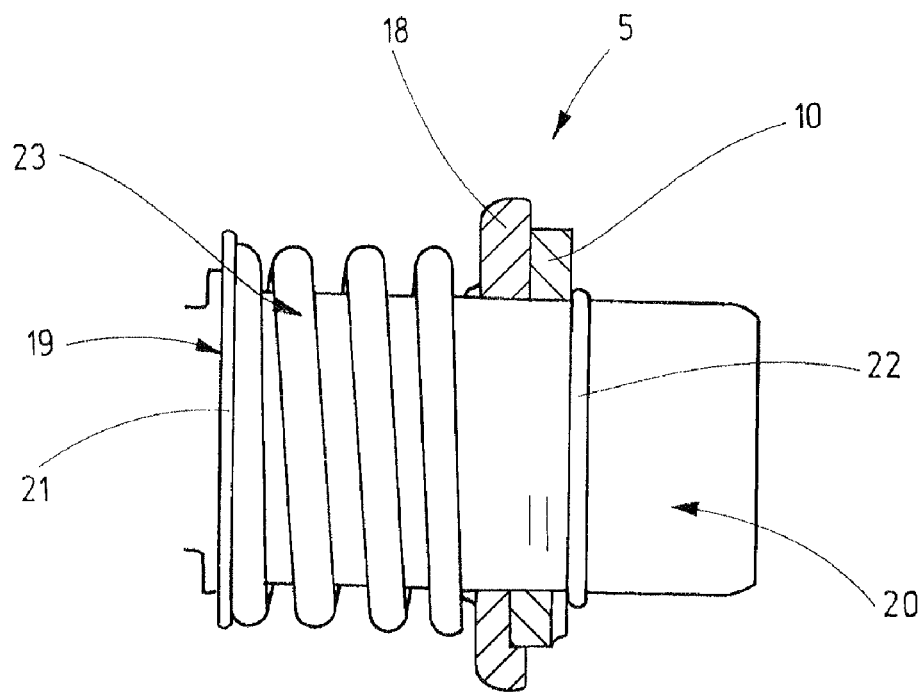
FIG. 1 shows a side view of a section through a rotary hammer in the region of a preferred overload coupling with a preferred detent disk.
Figure 2:
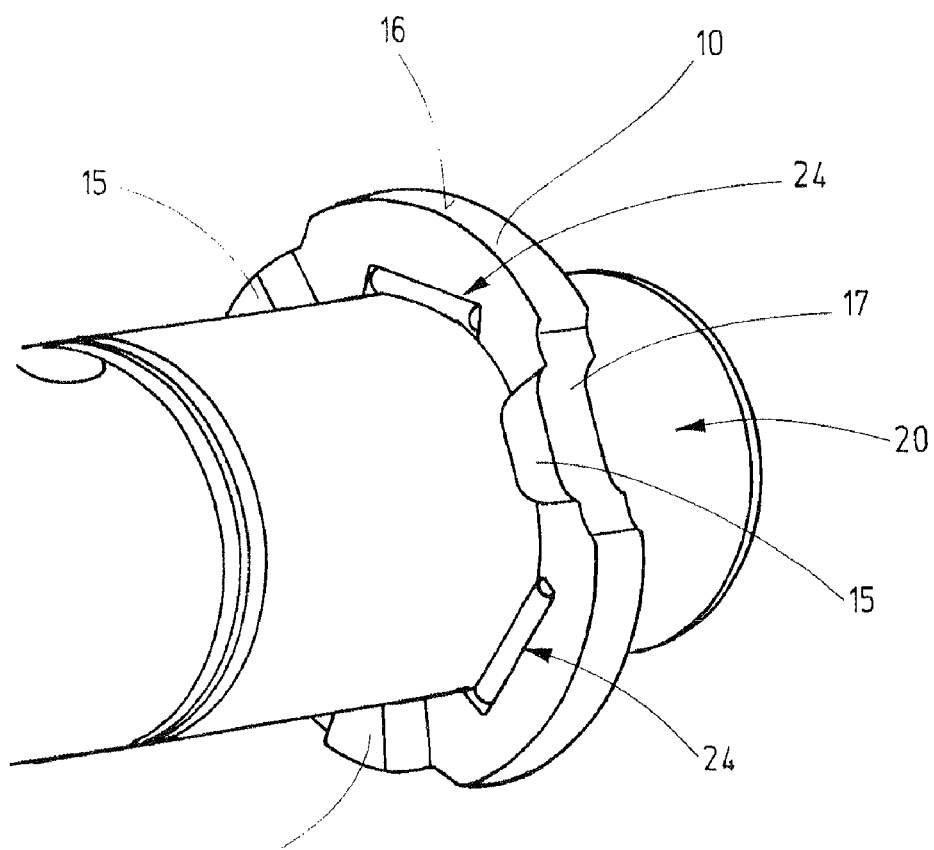
Figure 3:
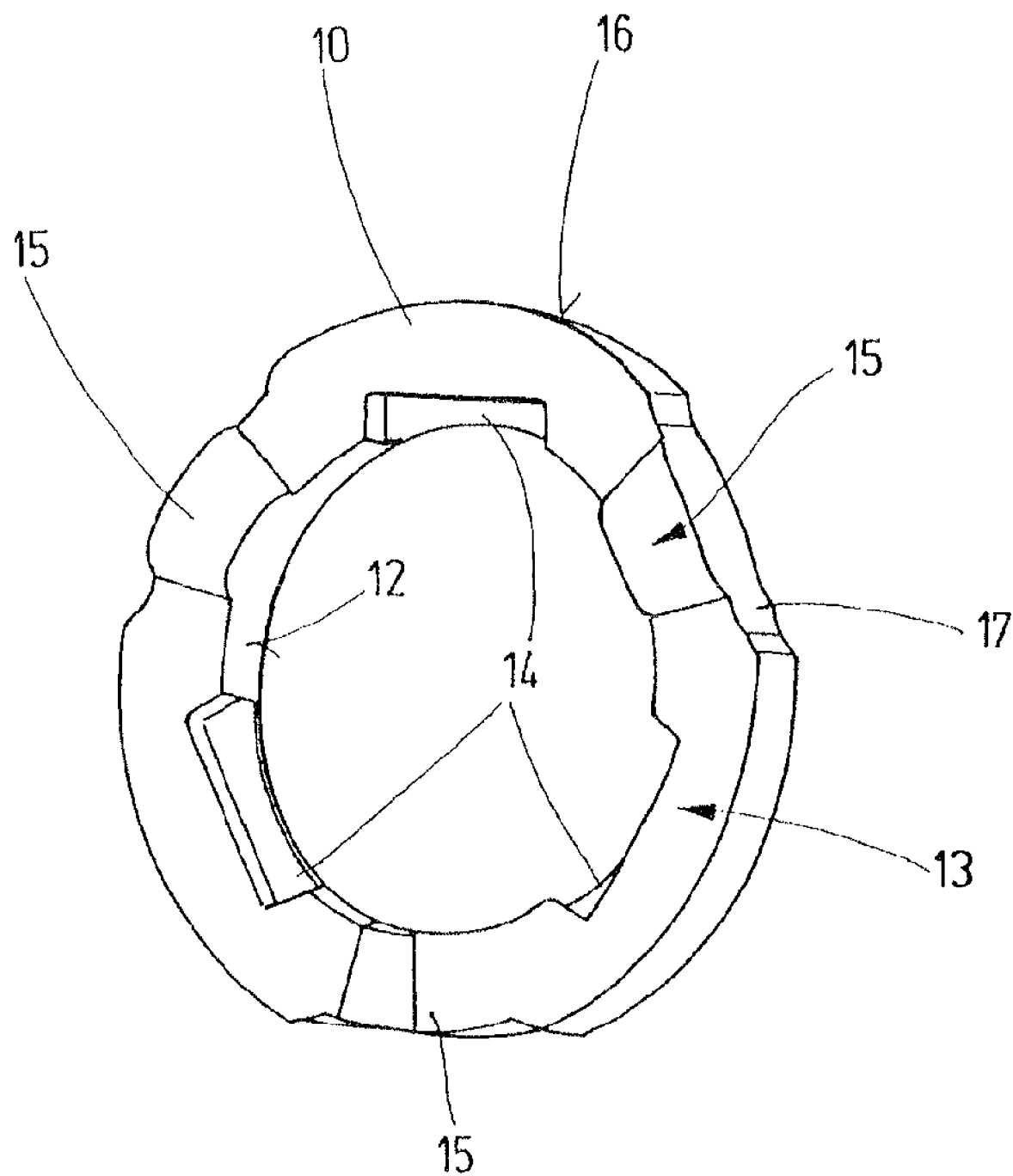
FIG. 3 shows a preferred detent disk from FIGS. 1 and 2, in detail.

FIGS. 1 through 3 show various views of a preferred detent disk 10 in the installed state, and the details of a preferred overload coupling according to the present invention.

The side view in FIG. 1 shows a section of a preferred rotary hammer with a rotary and/or percussive drive 20, configured as a hammer tube, in the region of its overload coupling, shown in a sectional view. A compression spring 23, a spur gear 18, and detent disk 10 are located on hammer tube 20 and are supported across the diameter of hammer tube 20. Hammer tube 20 serves to induce rotational motion in a not-shown tool. Detent disk 10 is pressed by a compression spring 23 against a snap ring 22 and, therefore, against hammer tube 20. Compression spring 23 is pressed forward, in the direction of the tool (not shown), by a supporting ring 19 and a snap ring 21. As a result, an axial force is introduced into hammer tube 20.

Detent disk 10 is driven in a rotary manner with hammer tube 20 via tangential driving pins 24, which are embedded in driving devices 14—configured as tangential pockets—on the inner circumference 12 of detent disk 10 and/or its detent-disk body.

Annular detent disk 10 includes detent cams 15 on its front face 13. Detent cams 15 engage in spur gear 18 of a spur gear transmission, a toothed gearing of spur gear 18 and detent cams 15 overlapping each other in the axial direction, which results in an advantageous overlap of functionality.

Detent cams 15 on front side 13 of detent disk 10 and driving devices 14 configured as transverse pockets are arranged in an alternating pattern in the circumferential direction, thereby resulting in a maximum driving surface of detent cams 15.

Instead of or in addition to detent cams 15 recesses can be provided for accommodating rolling elements.

Detent disk 10 has a durability-enhancing outer contour 17 on its outer diameter 16.

The depth of engagement of detent cams 15 in spur gear 18 is limited by the root circle of spur gear 18 and the necessary remaining wall thickness. This difference can be used to advantage in the design of detent disk 10—which is adapted for powder metallurgy and is appropriate for sintering, in particular—and makes it possible to create a stable detent disk 10. Detent disk 10 has a substantially uniform material wall thickness, as shown in FIGS. 2 and 3. The wall thickness of detent disk 10 above driving devices 14 designed as transverse pockets is comparable to that at detent cams 15 are staggered around the circumference.

Reference numeral 16 identifies an outer diameter of the detent disk.

The release torque of the preferred overload coupling is introduced into hammer tube 20 by tangential driving pins 24. This release torque is absorbed by the stepped shape of detent disk 10. To this end, the shape of detent disk 10 is selected such that outer contour 17 beyond detent cams 15 has a diameter similar to that of a root circle of a spur gear toothing of spur gear 18.

Reference numeral 25 identifies the root circle.

Figure 4:
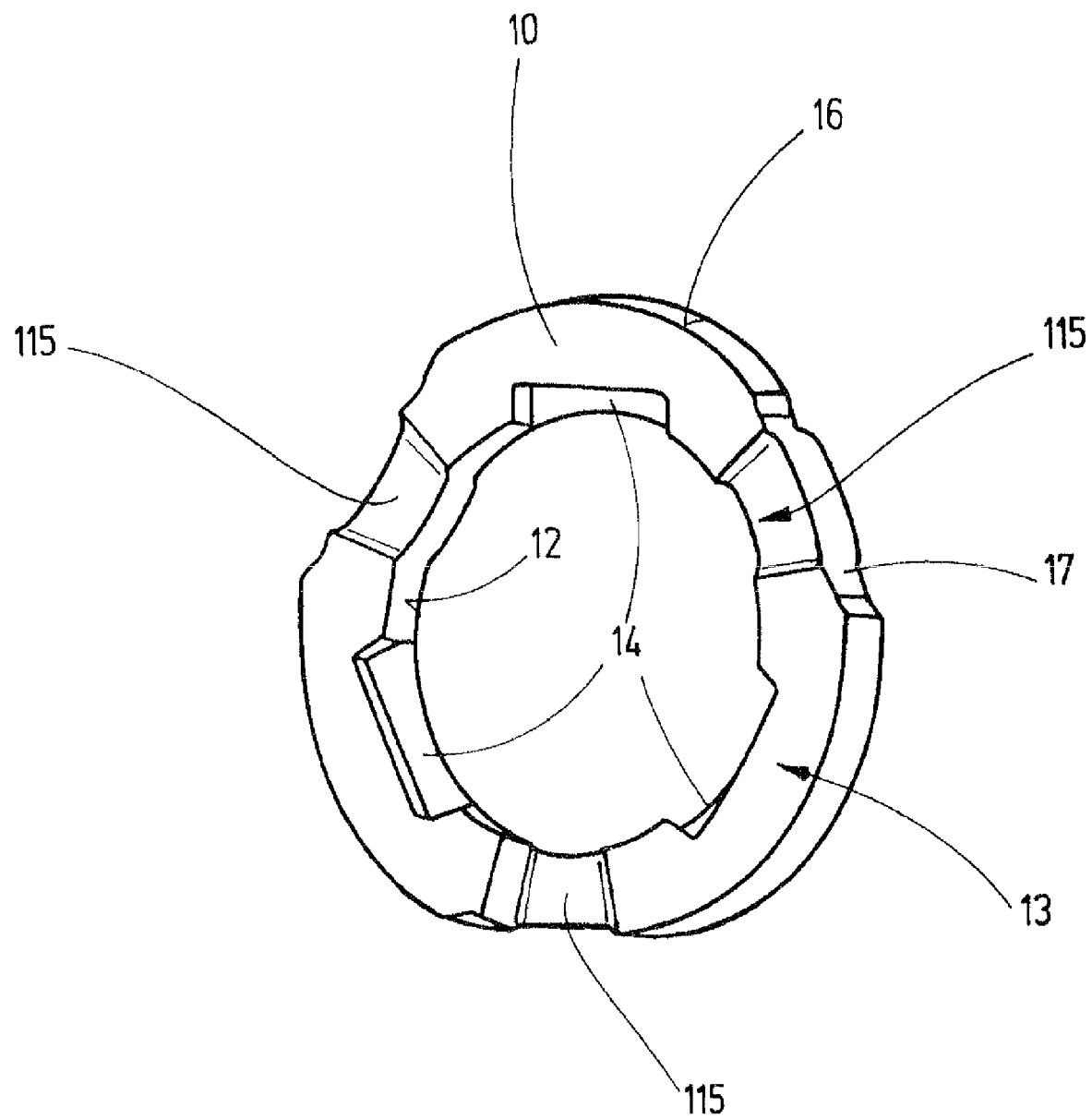
FIG. 4 shows another embodiment of the present invention.

In FIG. 4, reference numeral 115 identifies the recesses.

Reference numeral 5 identifies the overload coupling.

What is claimed is:

1. A detent disk for an overload coupling part comprising detent disk body configured as a powder-metallurgy produced disk body and having an inner circumference; and at least one driving device for driving in a rotary manner and provided on said inner circumference, said driving device being configured as a driving pocket, wherein said detent disk body has elements selected from the group consisting of detent cams located on an annular surface of said detent disk body, recesses for accommodating rolling elements, and both, wherein said detent disk body has a substantially uniform material thickness about said driving device and said detent cams and/or recesses, and wherein an outer diameter of the detent disk is reduced at said detent cams and/or recesses.

2. A detent disk as defined in claim 1, wherein said detent disk body has an annular shape.

3. A detent disk as defined in claim 1, wherein said detent disk body has an outer diameter with a durability-enhancing outer contour.

4. A detent disk as defined in claim 1, wherein said detent cams, said recesses, and said at least one driving device are arranged around a periphery of said detent disk body in an alternating pattern.

5. An overload coupling, comprising a detent disk configured for interrupting transmission of torque from a drive unit to a tool, said detent disk including a detent disk body configured as a powder-metallurgy produced disk body and having an inner circumference;

and at least one driving device for driving in a rotary manner and provided on said inner circumference, said driving device being configured as a driving pocket, wherein said detent disk includes on a front face of said detent disk elements selected from the group consisting of detent cams, recesses for accommodating rolling elements and both that are engagable in a spur gear of a spur gear transmission or a toothed gearing of a spur gear, said detent cams overlapping each other in an axial direction, wherein said detent disk body has a substantially uniform material thickness about said driving device and said detent cams and/or recesses, and wherein an outer diameter of the detent disk is reduced at said detent cams and/or recesses.

6. An overload coupling as defined in claim 5, wherein the overload coupling is configured for use for a machine tool.

7. An overload coupling as defined in claim 5, wherein said detent disk body has an inner diameter, further comprising at least one driving device provided on said inner diameter for establishing a rotary-driving connection with means selected from the group consisting of a rotary-driving means, a percussive-driving means, and both.

8. An overload coupling as defined in claim 5, wherein said detent disk body also has a circumferential outer contour with a diameter, in a region beyond said elements selected from the group consisting of said detent cams, said recesses for accommodating rolling elements, and both, which diameter is similar to that of a root circle of a spur gear toothing of a spur gear.

9. A machine tool, comprising an overload coupling as defined in claim 5.

* * * * *